4 Sheets—Sheet 1.

J. C. KLEIN.
Machine for Making Pick-Eyes.

No. 196,363. Patented Oct. 23, 1877.

Witnesses
E. P. Logan
E. L. Parker

Inventor John C. Klein
By Attorney George H. Christy.

4 Sheets—Sheet 2.

J. C. KLEIN.
Machine for Making Pick-Eyes.

No. 196,363. Patented Oct. 23, 1877.

Witnesses
Inventor John C. Klein,
By Attorney George H. Christy.

4 Sheets—Sheet 3.
J. C. KLEIN.
Machine for Making Pick-Eyes.
No. 196,363. Patented Oct. 23, 1877.
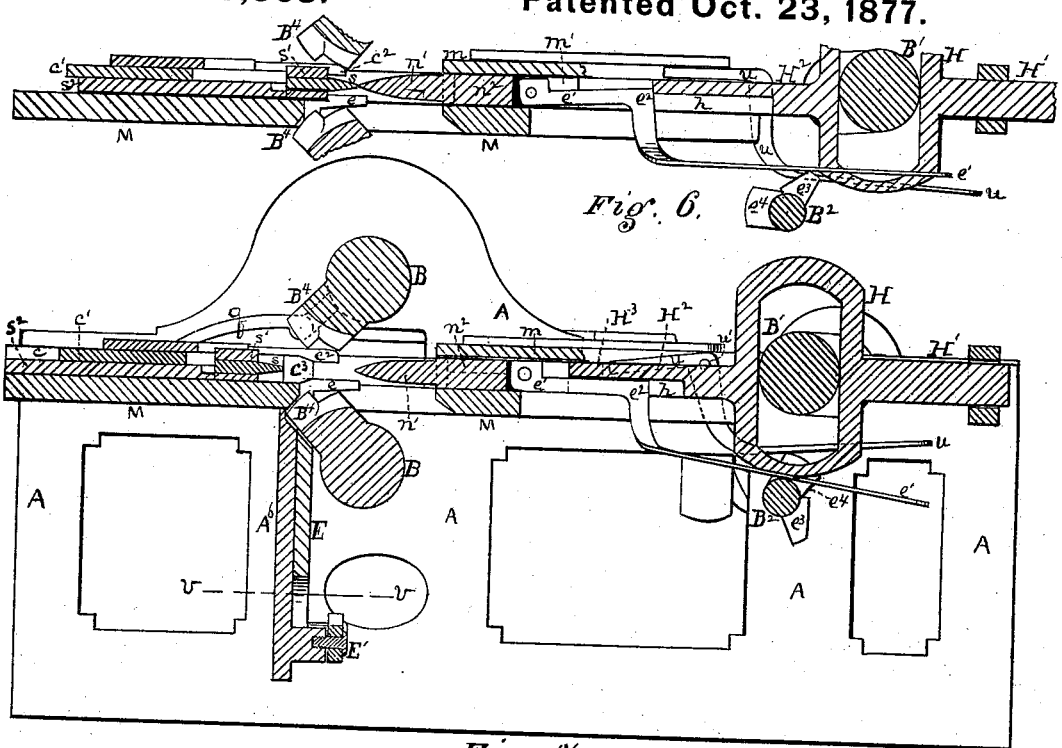
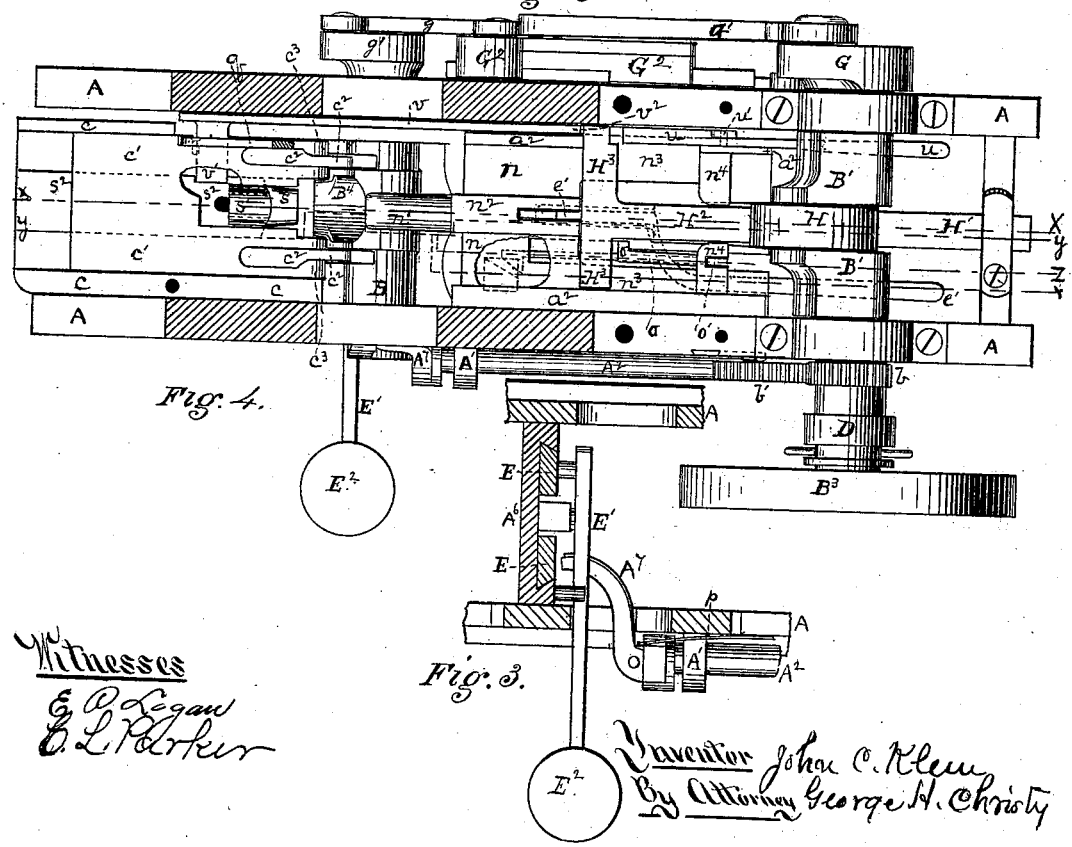

J. C. KLEIN.
Machine for Making Pick-Eyes.

No. 196,363. Patented Oct. 23, 1877.

Witnesses
E. P. Logan
O. L. Parker

Inventor John C. Klein,
By Attorney George H. Christy

N. PETERS, PHOTO-LITHOGRAPHER, WASHINGTON, D. C.

UNITED STATES PATENT OFFICE.

JOHN C. KLEIN, OF BALDWIN TOWNSHIP, ALLEGHENY COUNTY, PA.

IMPROVEMENT IN MACHINES FOR MAKING PICK-EYES.

Specification forming part of Letters Patent No. 196,363, dated October 23, 1877; application filed July 17, 1877.

*To all whom it may concern:*

Be it known that I, JOHN C. KLEIN, of Baldwin township, county of Allegheny, State of Pennsylvania, have invented or discovered a new and useful Improvement in Machines for Making Pick-Eyes; and I do hereby declare the following to be a full, clear, concise, and exact description thereof, reference being had to the accompanying drawing, making a part of this specification, in which—like letters indicating like parts—

Figure 1:
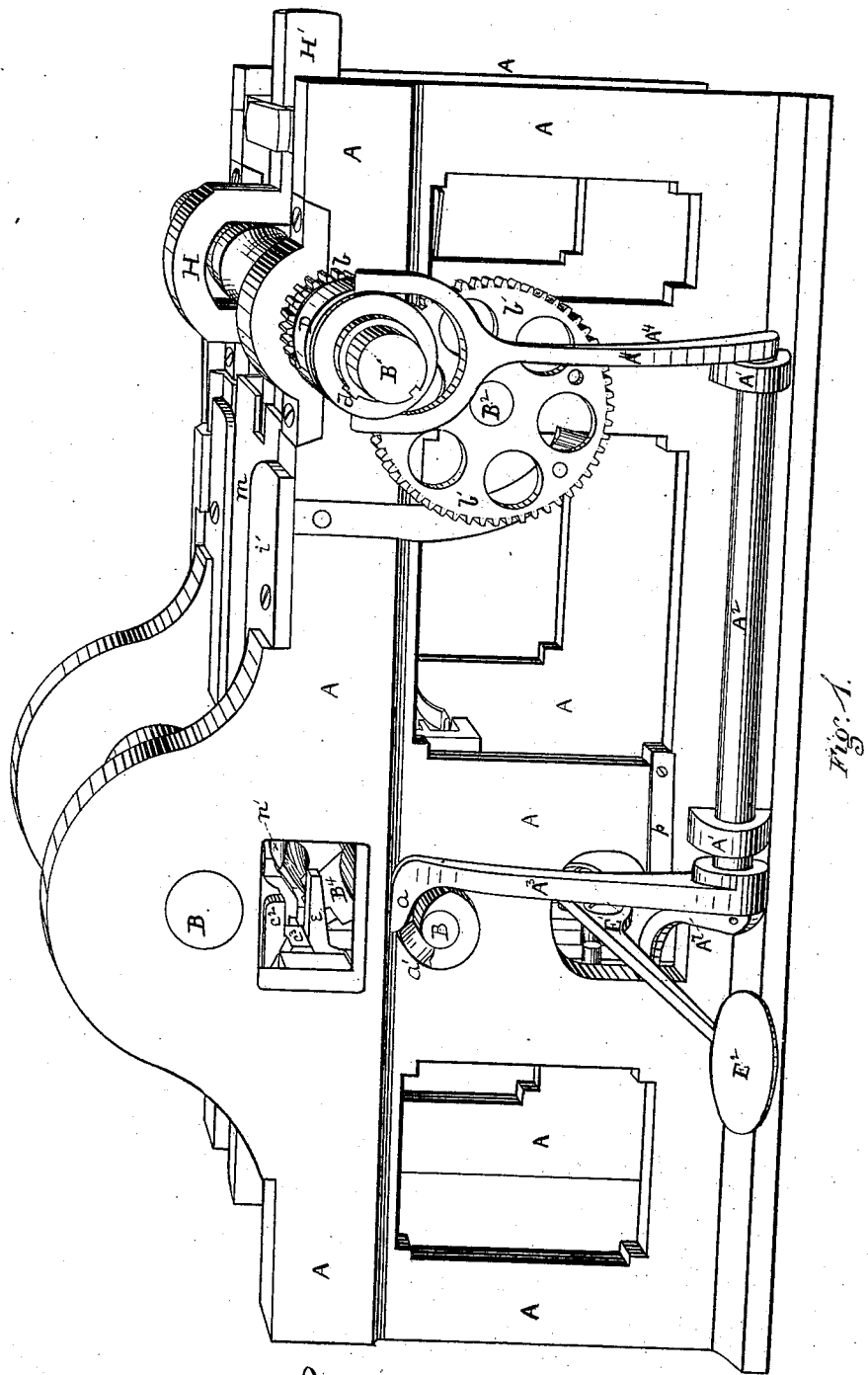
Figure 2:
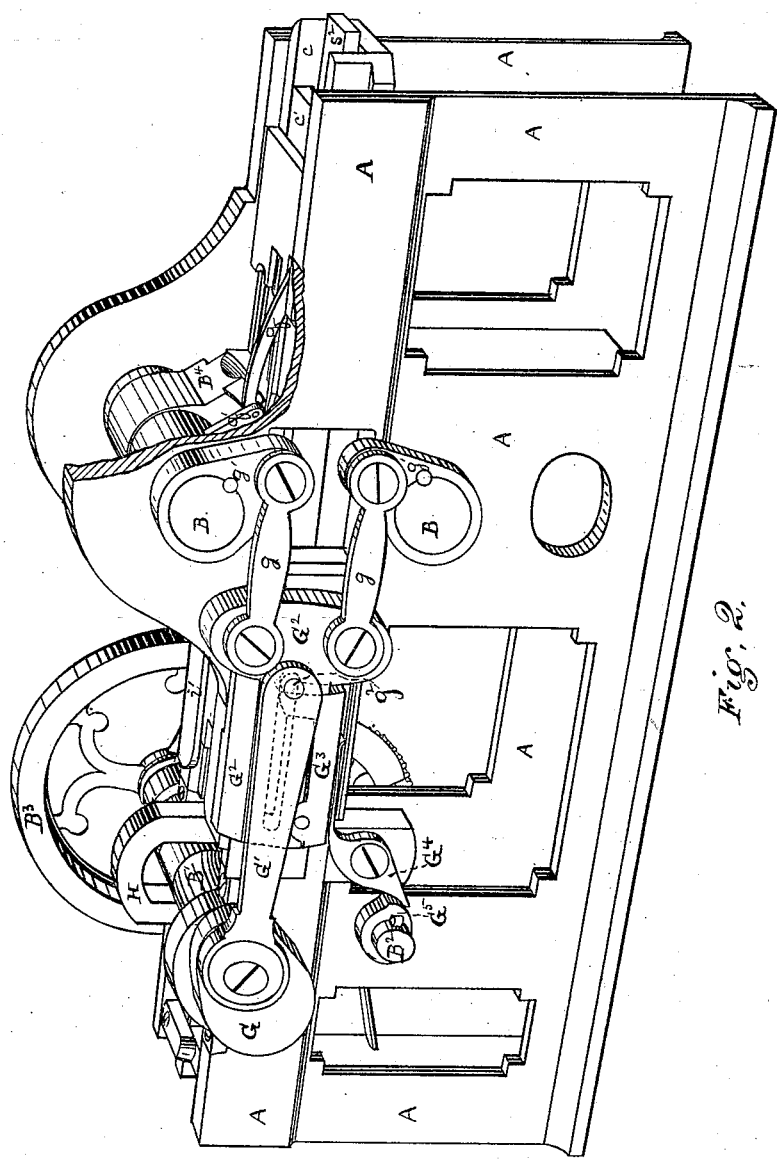
Figure 7:
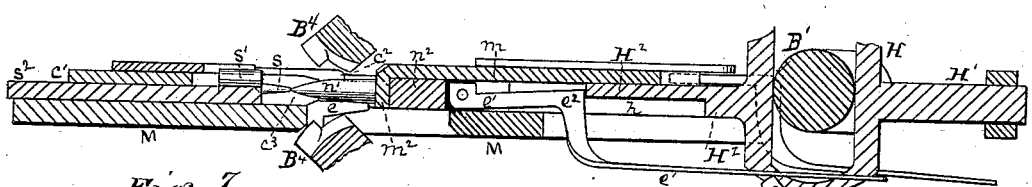
Figure 8:
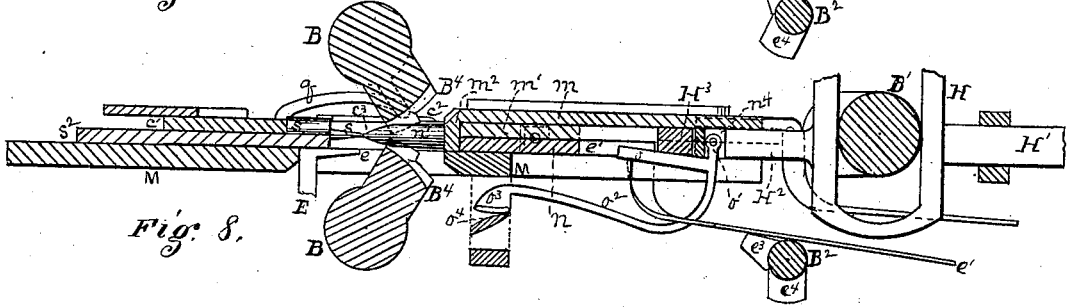
Figure 9:
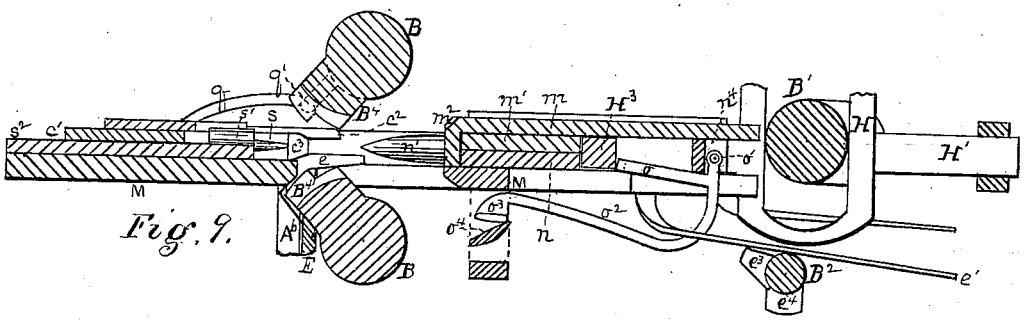
Figure 10:
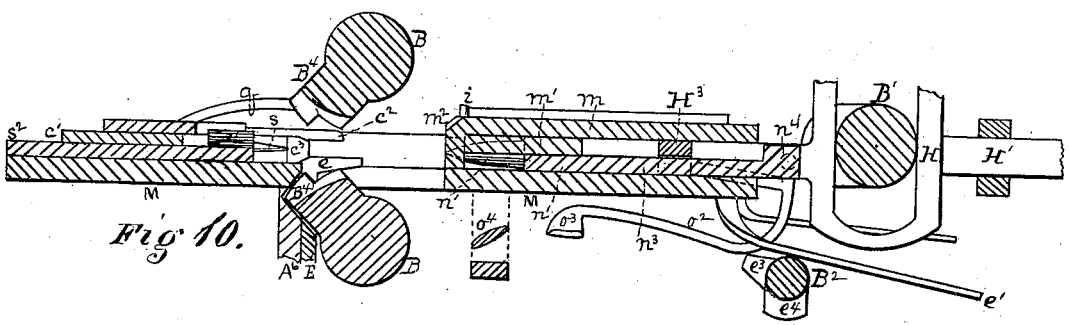

Figure 1, Sheet 1, is a perspective view of my improved machine, looking at it from one corner of the driving end; and Fig. 2, Sheet 2, is a like perspective view, looking at it from the diagonal opposite corner. Fig. 3, Sheet 3, is a detached sectional view in the line $v\ v$, Fig. 5. Fig. 4 is a top or plan view of the machine with the upper roll and its bearings removed, and also the top caps on both ends of the machine. Figs. 5 and 6 are longitudinal vertical central sections in the line $x\ x$, Fig. 4, showing the operative devices in different positions. Fig. 7, Sheet 4, is a like sectional view in the line $y\ y$, Fig. 4. Figs. 8 and 9 are like sectional views on the line $z\ y$, Fig. 4, showing the devices in different operative positions; and Fig. 10 is a like sectional view on the line $w\ y$, Fig. 4.

My invention relates in general terms to the manufacture of pick and mattock eyes having a tubular projection at one end of the eye, substantially such as are described in reissued Letters Patent No. 6,951, granted to me February 29, 1876, though the same is applicable to the manufacture of other similar eyes in tool-making.

With my present machine I take a heated blank, insert it in the machine and punch the eye, force in the mandrel, set down the ends of the blank, and draw out and shape the eye all at one operation, or by immediate successive operations in the same machine, and at the same or a single heat, so as to make complete and discharge the finished eye, requiring no further operations, except that of removing fins or ragged edges and ends.

The mechanism which I employ for driving the die-rolls resembles in some of its features that shown and described in Letters Patent granted to myself and Louis Gerber, No. 180,889, August 8, 1876.

The main frame of the machine, made in suitable construction for the purpose, is represented at A. This frame-work is of suitable shape for carrying a pair of die-rolls, B B, also a main driving-shaft, $B^1$, and a cam-shaft, $B^2$, the relative positions of the same being more particularly shown in Figs. 5 to 10.

Any suitable driving-gear, such as a band-wheel or crank, may be applied at any suitable point, but preferably to the end of the driving-shaft $B^1$, a key-seat for the attachment of the same being shown on the end of the shaft in Fig. 1, and the wheel itself being marked $B^3$ in Figs. 2 and 4. By means of the gearing $b$ and $b^1$ a suitably proportioned power is communicated to the cam-shaft $B^2$, so as to give it the proper motions.

In suitable bearings $A^1$ on one side of the main frame is a rock-shaft, $A^2$. On one end of this rock-shaft is an arm, $A^3$, having a projection, $a$, at its upper end, Figs. 2 and 4, which engages or bears against a cam-surface, $a^1$, on the end of the lower die-roll or roll-shaft. Affixed to the other end of the rock-shaft $A^2$ is a clutch-arm, $A^4$, forked at its upper end, and with the forks entering a groove in the clutch D, which, when shifted, is thrown into or out of engagement with a loose collar, the gear $b$ being on such loose collar, and the clutch D being affixed to the main driving-shaft $B^1$ by a key and feather, or other like device, the feather being shown at $d$, Fig. 1. By the use of this clutch device the cam-shaft $B^2$ is thrown into or out of gear with the driving-shaft at the pleasure of the operator.

The die-rolls B carry a pair of rolling-dies, $B^4$, substantially such in construction and operation as are described in the reissued Letters Patent above referred to, and the desired intermittently rocking or rolling motion is given to these dies by means of a crank, G, Fig. 2, and crank-arm $G^1$ and connecting-block $G^2$, two links, $g$, and the cranks $g^1$ on the ends of the die-rolls B.

The side parts of the main frame A are connected transversely a little below the line of feed and motion by a transverse table, M, this table being open or broken at intervals, as shown in the drawings, for the working devices which necessarily operate through such table.

Two raised ribs, $c$, on the left-hand end of this table constitute guides, between which I arrange a slide, $c^1$, the forward end of which terminates in two lugs, $c^2$, which, when the slide is back, stand one on each side of the rolling-dies $B^4$.

A vertical transverse web connecting the two side pieces of the frame-work is represented at $A^6$ in Fig. 5. On the right-hand face of this web $A^6$ I make a vertical-moving slide, E, which carries at its upper end a pair of angular lugs, $e$, such lugs coming almost or directly under the projecting lugs $c^2$ of the slide $c^1$. This vertical-moving slide E moves in a dovetail recess in the transverse web $A^6$, as more particularly represented in Fig. 3, and is raised at the pleasure of the operator by means of a lever, $E^1$, operated by a treadle, $E^2$, on which the operator places his foot at the proper time.

A blank or bar of proper size and properly heated is inserted from the side of the machine through the opening shown in Fig. 1, so that it shall pass in between the rolling-dies $B^4$ and also between the projecting lugs $c^2$ and $e$. The operator then, by depressing the treadle $E^2$, raises the slide E, so that the bar or blank is securely clamped between the lugs $c^2$ above and the lugs $e$ below. The end of the horizontal slide $c^1$ immediately under the lugs $c^2$ constitutes an abutment, against which the blank is supported and held in place on one side or edge.

The heated bar is now in position for being punched. The punch is represented at $s$. It is preferably made removable from its head-block $s^1$, so that different-sized punches may be employed. This punch head or block $s^1$ is secured to a sliding stem, $s^2$, the latter working in a recess on the under side of the horizontal slide $c^1$, and between it and the table M. Going now to the other end of the machine, the table M has a series of ribs, $a^2$, Fig. 4, which, with a part of the table end immediately underneath, constitute a box or way, within which is operated the mandrel-slide $n$, which latter carries at one end the mandrel $n^1$, and preferably removable therefrom, so as to provide for the use of mandrels of different sizes. This mandrel-slide has a central raised rib, $n^2$, and the opposite end is cut away so as to form two arms, $n^3$, Fig. 4, which arms terminate in a pair of raised lugs, $n^4$. This mandrel-slide receives its motions from an elbow or crank on the main driving-shaft $B^1$, which plays in the yoke H. This yoke H has a guiding-stem, $H^1$, on one side, which plays through a box, as shown, and a stem, $H^2$, on the other side, which terminates in a cross-head, $H^3$, the arms of which rest on the bifurcated arms $n^3$ of the mandrel-slide $n$, and also on the table M, between the arms $n^3$ and back of the raised lugs $n^4$ of the mandrel-slide.

In a slot of the raised rib $n^2$ of the mandrel-slide I pivot one end of a bent lever, $e^1$. This lever has an abrupt shoulder at $e^2$, Fig. 5, from which point it is bent down under the table $m$, and, turning a little to one side, its projecting free end passes over the eccentric shaft $b^2$, in suitable position to be engaged at intervals by the cam or wiper $e^3$.

As the cross-head $H^3$ and its stem $H^2$, during a portion of their stroke, pass over or operate on top of the bent lever $e^1$, they are recessed, as represented at $h$, for this purpose.

Returning now to the operation of the machine, the cross-head $H^3$, coming against the end of the raised rib $n^2$ of the mandrel-slide, drives the mandrel $n^1$ forward till its end comes against the edge of the blank opposite the punch, the devices then being in the position shown in Fig. 4 and also in Fig. 1. The operator then places his foot on the treadle $E^2$, and by depressing the same not only clamps the blank, as already described, but also the lever $E^1$ acts on the bent arm $A^7$, which is rigidly attached to the end of the rock-shaft $A^2$, thereby shifting the arms $A^3$ and $A^4$, Fig. 1, so as to throw the projection $a$ on its end against the eccentric $a^1$, and also shift the clutch D, so as to throw the apparatus into gear.

The mandrel and mandrel-slide are held in this position against the edge of the blank while the punch $s$ is being forced through the blank, by means of a hook, $o$, Figs. 4 and 9, which engages a counter-hook on the fixed table $m$, and which, at its opposite end, is turned up and pivoted in a recess in one of the raised lugs $n^4$ of the mandrel-slide, such turned up and pivoted end being marked $o^1$.

While the mandrel $n^1$ is thus held with its end against the edge of the blank, the punch $s$ is driven through the blank from the opposite edge by means of power communicated from the driving-shaft $B^1$, such power operating by means of a cam or wiper, $e^4$, on the eccentric shaft $B^2$, which cam or wiper engages a bent lever, $u$, pivoted at $u^1$ to a bar, $v$, which extends along the frame of the machine through between the die-rolls B, and at its opposite end, by an angular arm, $v^1$, enters a recess in the stem $s^2$ of the punch $s$.

The effect of the wiper $e^4$ thus engaging the free end of the lever $u$ is to depress the opposite end of the lever and drop it in back of one of the arms of the cross-head $H^3$, so that as the cross-head makes its back or return stroke it will come against the depressed end of such lever $u$, and, acting through it and its pivoted joint $u^1$ and the bar $v$, will drive the punch $s$ through the blank. As soon as this is done, the outer or free end of the lever $u$, being the heavier, will drop down and throw the opposite end of the lever out of engagement with the cross-head $H^3$, and the devices will then be in the position shown in Fig. 6, the punch and mandrel meeting, or nearly so, in the blank or at one side thereof.

The cross-head $H^3$ being now at the back end of its stroke, the cam or wiper $e^3$, on the cam-shaft $B^2$, engages the outer or free end of the lever $e^1$, and raises the shoulder $e^2$ into position forward of the cross-head $H^3$, as shown in Fig. 6. The cross-head $H^3$ at its next forward stroke engages this shoulder $e^2$, so as to drive the mandrel $n^1$ forward through the eye made by the punch $s$ at the previous stroke, and also, by operating against a shoulder, $v^2$, on the bar $v$, drives the punch $s$ back at the same time, and thereby forces the mandrel $n^1$ through the blank. The shape of this mandrel is such as to open out the eye to the desired size and interior form. The wiper $e^3$ having passed its contact with the lever $e^1$, the latter drops by its own weight, and the shoulder $e^2$ no longer engages the cross-heads.

The cross-head $H^3$ has sufficient freedom of motion, or loose motion, to enable these shifting parts to come properly into position, and with sufficient freedom at the proper time. On the top of the mandrel-slide I arrange a cap-plate, $m$, and on the under-side of this plate there are two ribs, $m^1$, which occupy the space on top of the slide $n$, between its central rib $n^2$ and the side guides $a^2$. These ribs $m^1$ terminate at one end even with the central rib $n^2$ of the mandrel-slide. This top plate is bent down forward of the mandrel-slide, as represented at $m^2$, so as to be driven forward with every forward stroke of the mandrel-slide and the mandrel.

By the use of this device I am enabled to set down the ends of the blank at each side at the stroke of the machine last described—viz., that which drives the mandrel through the eye. In this operation of setting down the ends of the blank, the ends of the slide $c^1$ on the opposite side of the rolls constitute an abutment, which I have lettered $c^3$, the space between such abutments being that in which the punch moves, and also the space into which the projecting end of the eye is forced in the setting-down operation.

One edge of the blank resting against these abutments $c^3$, the continued forward stroke of the cross-head $H^3$ drives the mandrel through the blank, as already described, and also drives the end $m^2$ of the cap-plate against the opposite edge of the blank, so as by forcing it against the abutments to set down the arms of the blank, and allow a ridge of metal around the eye to project forward between the abutments $c^3$. The blank is now punched, opened out, and set down, and the mechanism is in the position shown in Fig. 7, and the dropping of the lever $e^1$, already described, takes place immediately after this setting-down step; but in this operation, it should be added that the slide $c^1$, the ends of which constitute the abutments referred to, is prevented from moving back by means of a link-connection, $q$, which extends from the slide $c^1$ and crank-arm $q'$ on the upper roll B, these die-rolls, up to this point, not having been brought into operation.

The motion of upsetting brings the blank into suitable position to be operated on by the rolling-dies $B^4$. Up to this point the wrist-pin $g^2$, in the forward end of the crank-arm or connecting-rod $G^1$, has played back and forth freely in a slot formed in the block $G^2$, as indicated by dotted lines in Fig. 2. On the under side of this block is a swinging catch, $G^3$, which, at this time in the operation of the machine, is shifted upward, so that its angular projection shall come back of the wrist-pin $g^2$, and thereby make a working connection between the main driving-shaft and the die-rolls.

The shifting of this swinging catch $G^3$ is effected by means of a bent lever, $G^4$, pivoted to the frame of the machine, and one end operated by means of a cam, $G^5$, on the projecting end of the cam-shaft $B^2$, so as to raise the other end of the bent lever and throw the swinging catch into the position described. At the same time that this is done the cross-head $H^3$ engages the raised lugs $n^4$ of the mandrel-slide, so as to give the mandrel and the blank thereon a motion corresponding to that of the rolling-dies $B^4$; and also the motion of the rolling-dies, communicated through the crank $q'$ and the connecting-link $q$, carries forward the slide $c^1$, and the blank, thus inclosed on all sides and moved at the proper speed, is operated on by the rolling-dies $B^4$, so as to draw out the projecting walls of the eye, and shape the exterior of the eye to the proper form, this operation being particularly illustrated in Fig. 8.

In this operation the dies at one end operate on the top and bottom faces of the blank, and at the other end they encompass the projecting walls of the eye, so as to draw the same out like a tube and effect the desired elongation.

To prevent the lateral spread of the metal between the walls of the rolling-dies, I make use of the inner adjacent faces of the abutments $c^3$.

It will be remembered that the projecting walls of the eye are formed at their ends between these abutments. By the use of the devices described the abutments are moved forward simultaneously with the motion of the blank, so that while the projecting walls are being operated on by the rolling-dies the abutments will come immediately outside of and in close proximity to the exterior walls of the dies, so as to prevent, as far as practicable, the lateral spread of the metal and the formation of fins.

The relationship of the inner walls of these abutments $c^3$ to the walls of the dies is shown in Fig. 4.

The shape and form of the rolling-dies $B^4$ and their action on the blank are substantially the same in this machine as in the reissued patent above referred to, and need not be further described.

With the reverse motion the die-rolls return to their former position, the slide $c^1$ is carried back by its link-connection $q$, and the punch $s$ is also forced back by the cross-head $H^3$ engaging the shoulder $v^2$ of the bar $v$. the blank remaining on the mandrel, and the mandrel remaining stationary, in consequence of the hook $o$, which is pivoted to the wrist in one of the raised lugs $n^4$ of the mandrel-slide engaging a shoulder on the table $m$, as above described. During this stroke of the machine, and while the cross-head $H^3$ is moving toward the die-rolls, a spring-arm, $v^2$, attached to the hook $o$, rides with its free end $o^3$ up an incline, $o^4$, made in a lug on the under side of the table. The riding of the end of this spring-arm up the incline presses the hook $o$ upward, so that as soon as the cross-head $H^3$ passes the end of the hook $o$ the latter is shifted upward behind the cross-head $H^3$ to the position represented in Fig. 9, so as to make a locking-connection between the cross-head and the mandrel-slide, to which the hook is pivoted at its other end; then, on the back stroke of the cross-head $H^3$, it draws back the mandrel-slide and the mandrel, so as to strip the latter from the blank, and the blank is held from moving back so as to be stripped from the mandrel by coming against the bent-down end $m^2$ of the cap-plate $m$, and the latter is held as against a reverse motion at this point by a stop-pin, $i$, which projects from its upper face, engaging the end of the clamping-plate $i^1$, or any other fixed stop attached to a non-moving part of the machine. The blank, thus being stripped from the mandrel, drops out of the machine complete, and, after the ragged edges are removed in the usual way, is ready for the attachment of the points.

The operation of the machine carries the end $o^3$ along the under side of the incline $o^4$, so as to be in position for repeating in the operation described the shifting of the hook, the arm $o^2$ having sufficient spring-action to enable it to pass the incline, even though in doing so it does not change the position of the hook $o$ when acting as a holding device to connect the mandrel-slide with the table M.

It should be added that the rolling stroke of the die-rolls brings the eccentric face $a^1$ against the projection $a$ of the arm $A^3$, so as to reverse the motion imparted to the rock-shaft $A^2$ by means of the treadle $E^2$, and thereby throw the cam-shaft $B^2$ out of gear, and also permit the vertically-moving slide $E$ to drop by its own weight and loosen the bite, which, at the beginning of the operation, the lugs $c^2$ and $e$ took on the blank, and thus permit the blank to drop as soon as stripped from the mandrel; also, as soon as the die-rolls have completed their rolling stroke and returned, the bent lever $G^4$, which operates the swinging catch $G^3$, shifts its position by a preponderance of weight at the end which engages the swinging catch, and permits the latter to drop out of engagement with the wrist-pin $g^2$, so that the die-rolls cease to operate at all until another blank is fed in, the apparatus again put into gear, and the operation carried up to the proper point.

To prevent the arm $A^3$ from being accidentally shifted so as to throw the apparatus into gear, I arrange a spring, $p$, immediately back of the same, but with its power properly graduated, so that it shall not shift it back when shifted over as in the manner described.

In the machine, as represented in the drawings, the gear-wheels $b$ and $b'$ are proportioned as one to two, though it would be better on some accounts to proportion them as one to three; in which latter case, by making some changes in the driving-connections, the hook $o$ could be dispensed with. But with the machine as represented, and starting immediately after the discharge of the finished blank, I will briefly state the successive motions of the cross-head $H^3$, assuming that a heated blank has been fed in and clamped and the apparatus thrown into gear.

At the first forward stroke the mandrel is advanced to, or about to, the edge of the blank, and the hook $o$ engages the table. Then by a back and forward stroke the lever $u$ is brought into engagement with and back of the cross-head. With the next back stroke the punch is driven or drawn through the blank, and the hook or lever $e^1$ is brought into position in front of the cross-head.

With the next forward stroke the punch is forced out of the blank, the mandrel is driven through the blank, and the end $o^3$ of the spring-arm $o^2$ is carried past the incline $o^4$, and the ends of the blank are also set down. With the next back stroke of the cross-head the rolling out of the eye is effected, and with the following forward stroke the dies are caused to clear the blank; also, the hook $o$ is thrown up back of the cross-head, so that with the next reverse or back motion of the cross-head the mandrel is drawn back and the blank is stripped off.

I claim herein as my invention—

1. In a machine for making pick-eyes, the combination of a punch to perforate the blank from one side, and a mandrel to pass through, open out, and enlarge the eye from the opposite side, the two being arranged in line with each other, substantially as set forth.

2. The combination of perforating-punch $s$, enlarging-mandrel $n^1$, and clamps $c^2$ and $e$, substantially as set forth.

3. The combination of die-rolls $B^4$, mandrel $n^1$, ram or plunger device $m^2$, and abutments $c^3$, suitably arranged for the setting down and rolling out of the blank on the same machine and at one heat, substantially as described.

4. The abutment $c^3$, in combination with the die-rolls $B^4$, arranged to move simultaneously therewith, for preventing the undue lateral spread of the metal, substantially as described.

5. The combination, in one machine, of a clamping device to clamp the blank, a punch to make the eye, a mandrel to enlarge and open it, a setting-down device, and a pair of die-rolls, all arranged to be operative on the same blank simultaneously or in immediate or close succession, substantially as described.

6. The combination, in one machine, of a clamping device, punch, mandrel setting-down device, die-rolls, stripper, and automatically-operated device for unclamping the blank, whereby it is discharged, substantially as described.

7. A driving-shaft, $B^1$, having suitable mechanical connections to and in combination with a punch and mandrel, whereby the latter may be forced in opposite directions through the same blank by successive strokes, substantially as described.

8. The combination of driving-shaft $B^1$ and cam-shaft $B^2$, geared together and arranged with suitable connections to die-rolls, punch, and mandrel, whereby the same are caused to operate simultaneously or in quick succession, substantially as described.

9. The combination of movable cross-head $H^3$, mandrel-slide $n$, mandrel $n^1$, cap $m$, hook $o$, and lever $o^2$, arranged to intermittingly operate the hook, whereby a blank is automatically stripped from the mandrel, substantially as described.

10. The driving-shaft $B^1$ and cam-shaft $B^2$, geared together, in combination, through suitable connections, with the cross-head $H^3$ and mandrel-slide $n$, whereby the mandrel $n^1$ and cap $m$ are automatically and intermittingly operated, substantially as set forth.

11. The driving-shaft $B^1$ and cam-shaft $B^2$, geared together, in combination, through suitable connections, with cross-head $H^3$ and bar $v$, whereby the punch $s$ is intermittingly and automatically operated, substantially as set forth.

12. The driving-shaft $B^1$ and cam-shaft $B^2$, geared together, in combination with the movable block $G^2$ and arms $g$, whereby the die-rolls $B$ are intermittingly and automatically operated, substantially as described.

13. The combination of clutch $D$, rock-shaft $A^2$, having arms $A^3 A^4 A^7$, cam $a^1$, and treadle $E^2$, substantially as and for the purpose set forth.

In testimony whereof I have hereunto set my hand.

JOHN CHR. KLEIN.

Witnesses:
J. J. McCORMICK,
CLAUDIUS L. PARKER.